United States Patent [19]
Kemmler

[11] Patent Number: 5,485,274
[45] Date of Patent: Jan. 16, 1996

[54] FIBER OPTIC INTERFEROMETER WITH WAVELENGTH-STABILIZED LIGHT SOURCE

[75] Inventor: Manfred Kemmler, Vörstetten, Germany

[73] Assignee: Litef GmbH, Freiburg im Breisgau, Germany

[21] Appl. No.: 324,762

[22] Filed: Oct. 17, 1994

[30] Foreign Application Priority Data

Oct. 28, 1993 [EP] European Pat. Off. ............ 93117510

[51] Int. Cl.$^6$ .................................................. G01C 19/64
[52] U.S. Cl. ............................................................ 356/350
[58] Field of Search .............................................. 356/350

[56] References Cited

U.S. PATENT DOCUMENTS

5,123,741  6/1992  Spahlinger .............................. 356/350
5,311,279  5/1994  Wendler .............................. 356/350 X
5,365,338  11/1994  Bramson .............................. 356/350

Primary Examiner—Vincent P. NcGraw
Attorney, Agent, or Firm—Elliott N. Kramsky

[57] ABSTRACT

An integrated optics chip is employed as a Michelson interferometer for stabilizing the wavelength of a light source in a fiber optic Sagnac interferometer for measuring rotation rate. A statistically-independent second signal component is applied in addition to a resetting digital phase ramp dependent on rotation rate to a phase modulator incorporated in the integrated optics chip (MIOC). The second signal component optimizes the working point of the phase modulator. By employing such statistically-independent variation of the phase modulation, the light wavelength-dependent measuring signal of the Michelson interferometer may be demodulated from the detector read-out signaled used for readjustment of the light-source wavelength via a light-source temperature and/or injection current change. In open loop operation, scale factor variations can be compensated using the light wavelength-dependent measuring signal.

9 Claims, 6 Drawing Sheets

FIBER OPTIC INTERFEROMETER WITH WAVELENGTH-STABILIZED LIGHT SOURCE

BACKGROUND

1. Field of the Invention

The present invention relates to fiber optic Sagnac interferometers for measuring rotation rate. More particularly, this invention pertains to such a device that incorporates apparatus for light source wavelength stabilization.

2. Description of the Prior Art

U.S. Pat. No. 5,123,741 of Spahlinger issued Jun. 23, 1992 and titled "Fiber Optic Sagnac Interferometer with Digital Phase Ramp Resetting Via Correlation-Free Demodulator Control", property of the assignee herein, describes a fiber optic Sagnac interferometer for measuring rotation rate that discloses a particular modulation/demodulation scheme. In that scheme, the phase difference between the counterpropagating pair of light beams is modulated by a signal composed of a plurality of variable components and limited by a modulo operation to $2\pi$. A first signal component is a ramp generated by an integration process that compensates non-reciprocal incremental phase shifts of the two light beams. A second signal component represents a positive integral value of $\pi/2$ in each instance for $t_o$, the transit time of each light beam through the coil in the neutral condition. This component comprises the sum of two components, the first component being formed from alternately successive values 0 and $\pi/2$, and the second component formed from values 0 and $\pi$ which are successive to a large extent without correlation. The detector signal is demodulated by a synchronous demodulator driven by the product of four factors. The first factor has the value $-1$. The second factor is $-1$ if the second component is 0, and is $+1$ if the second component is $\pi$. The third factor is $-1$ if the second component derived from the last preceding modulation cycle was 0, and is $+1$ if the second component derived from the preceding modulation cycle was $\pi$. The fourth factor is $-1$ if the first component has the value 0, but is $+1$ if the first component has the value $\pi/2$.

Fiber optic rotation rate sensors of the foregoing type with statistical modulation, controlled by a random generator for the drive signal of a phase modulator, avoid the bias defects caused by electromagnetic cross-couplings. As a consequence, insensitivity ranges, an inherent problem of all rotation rate sensors of this type and corresponding quality requirements, are avoided.

Figure 1:
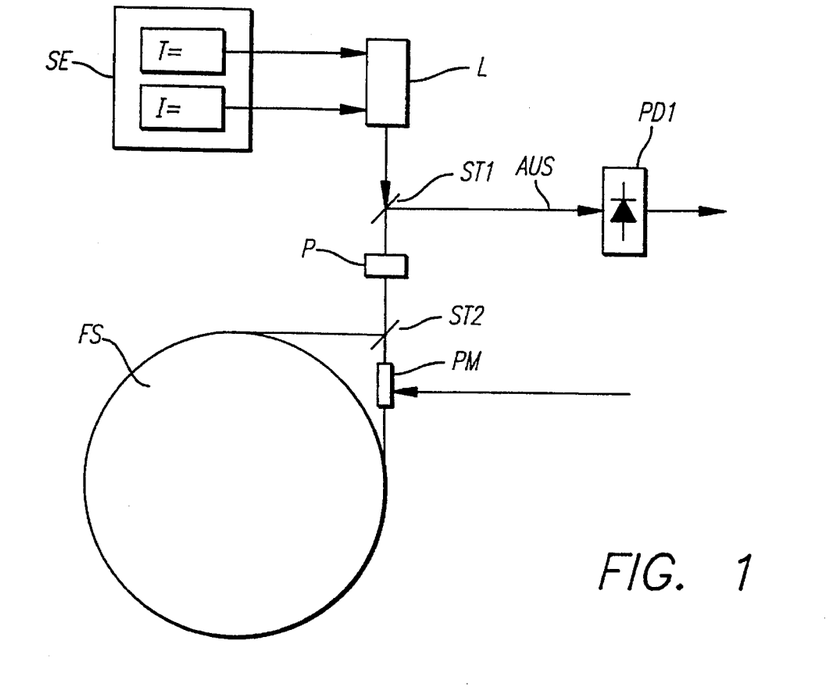
FIG. 1 is a schematic diagram of a partial section of a rotation rate sensor with electronic light source wavelength stabilization.

The magnitude of the measurement signal in the measurement of non-reciprocal phase shifts due to rotation with a fiber optic Sagnac interferometer for a given input rotation rate is inversely proportional to the wavelength of the light source. Accordingly, attempts have been made to stabilize the wavelength of the light source. An example of such an attempt is illustrated in FIG. 1 which discloses a light source L operated with a stabilizing electronic system SE which keeps the injection current I and/or the temperature T constant. The remaining assemblies of the fiber optic Sagnac interferometer or rotation rate sensor shown only partially in FIG. 1 are well known to those skilled in the art. These include a beam splitter ST1 irradiated by the light source L, a downstream polarizer P, a second beam splitter ST2 for splitting the polarized light beam into two identical partial light beams that are injected into the two ends of a fiber coil FS. A phase modulator PM is situated in one branch of the coil FS. The two partial light beams are recombined, after passing through the fiber coil FS, at the second beam splitter ST2. The interference pattern arising as a result of a phase shift between the two partial light beams, created by rotation of the fiber coil FS, is coupled out at the beam splitter ST1 and acts in a known manner on a photodetector PD1.

A further possibility for stabilizing the wavelength of the light source L (taught, for example, by U.S. Pat. No. 5,311,279 of Wendler issued May 10, 1994 and titled "Integrated Optical Apparatus For The Interferometric Measurement of Light Waves", property of the assignee herein, and illustrated in FIG. 2) consists of directly measuring the wavelength by means of an additional detector PD2 employing an additional unbalanced measuring interferometer M1. The interferometer M1 is trans-irradiated by a part of the light branched off at the first beam splitter ST1, and a regulating signal is derived therefrom to stabilize the wavelength of the light source L.

A fundamental disadvantage of the first method is that the wavelength is only indirectly stabilized and possible ageing effects are not covered. The second method, requiring an additional measuring interferometer, incurs a not-inconsiderable additional hardware expenditure.

SUMMARY AND OBJECTS OF THE INVENTION

Figure 2:
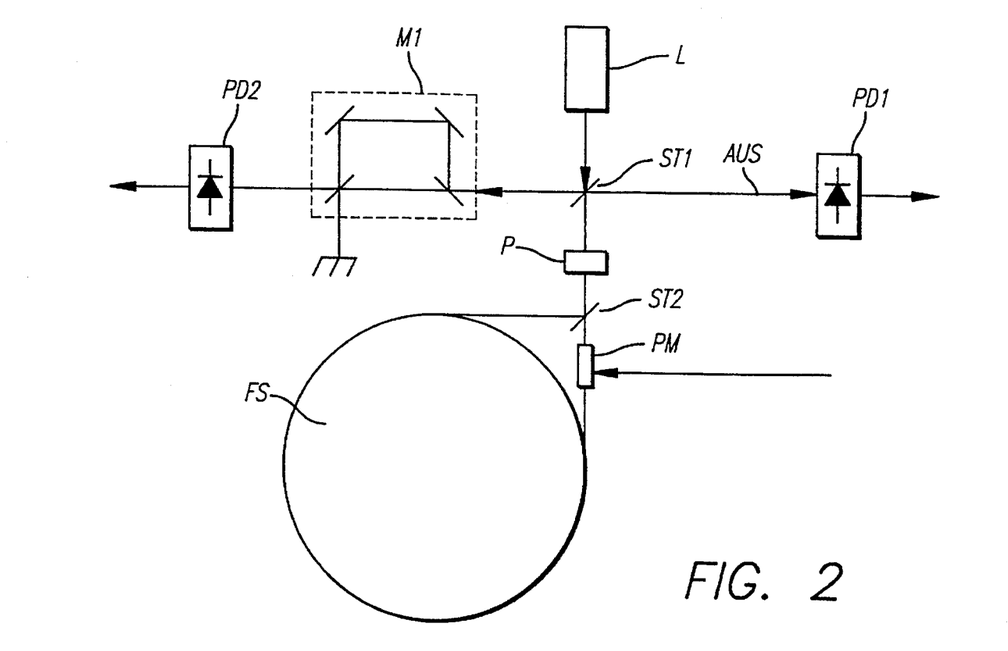
FIG. 2 is a schematic diagram of a partial section of a fiber optic rotation rate sensor with direct measurement of light source wavelength by a separate Michelson interferometer with specified temperature-invariant properties.

It is therefore the object of the present invention to achieve the advantages of direct measurement of light source wavelength in a fiber optic Sagnac interferometer without the additional expenditure for separate measuring hardware of the type disclosed in FIG. 2.

The present invention addresses the foregoing and other shortcomings of the prior art by providing, in a first aspect, an improvement in a Sagnac interferometer for measuring rotation rate of the type in which a pair of light beams that originate from a light source are polarized and generated by beam splitting, injected in opposite directions into a fiber coil and subsequently recombined. In such an interferometer, the created interference pattern acts, after passing through the polarizer, on a detector whose output corresponds to the light intensity of the interference pattern. The light beams are modulated by means of a phase modulator located downstream of the beam splitting and ahead of the fiber coil by a signal composed of a plurality of variable components and limited by modulo operation to $2\pi$. A first signal component is a ramp generated by means of an integration process that compensates non-reciprocal incremental phase shifts of the two light beams and a second signal has a positive integral value of $\pi/2$ in each instance for a time $t_o$, the transit time of each light beam through the fiber coil in the neutral condition. The second signal component is composed of the sum of two components, the first component formed from alternately successive values 0 and $\pi/2$ and the second component formed from values 0 and $\pi$ which are successive to a large extent without correlation.

The output of the detector is demodulated by a first synchronous demodulator driven by the product of four factors: the first factor is $-1$; the second factor is $-1$ when the second component is 0 and $+1$ when the second component is $\pi$; the third factor is $-1$ when the second component derived from the last preceding modulation cycle is 0 and $+1$ when the second component derived from the preceding modulation cycle is $\pi$; and the forth factor is $-1$ when the first component is 0 and $+1$ when the first component is $\pi/2$.

The improvement provided by the invention involves a portion of the light beams downstream of the phase modulation and beam splitting being reflected, recombined and directed, after passing through the polarizer, onto the detector. The output of the detector is demodulated by a second synchronous demodulator driven by the product of two factors: the first factor is −1 when the first component is 0 and +1 when the first component is π/2; the second factor is −1 when the ramp is between 0 and π/2 or between π and 3π/2 and +1 when the ramp is between π/2 and π or between 3π/2 and 2π. The signal demodulated by the second synchronous demodulator varies the wavelength of the light source by selectively varying at least one of two factors, the temperature and the source injection current of the light source.

In another aspect, the invention provides a fiber optic Sagnac interferometer for measuring rotation rate of the type in which: (i) a pair of light beams that originate from a light source and are polarized by a polarizer and generated by beam splitting are injected in opposite directions into a fiber coil and subsequently recombined; (ii) the resulting interference pattern acts, after passing through the polarizer, on a detector whose output corresponds to the intensity of the interference pattern; (iii) the two light beams are modulated by a phase modulator located downstream of the beam splitting and before the fiber coil; (iv) the amplified photodetector output is fed to a first synchronous demodulator; (v) the modulation signal acting on the phase modulator is formed of the sum of two components, the first component being alternatively successive values 0 and π/2 and the second component being 0 and π which are successive to a large extent without correlation; (vi) the first synchronous demodulator being driven by the product of four factors: the first factor is −1, the second factor is −1 when the second component is 0 and +1 when the second component is π, the third factor is −1 when the second component is π, the third factor is −1 when the second component derived from the last preceding modulation cycle is 0 and is +1 when the second component derived from the preceding modulation cycle is π, and the fourth factor is −1 when the first component is 0 and is +1 when the first component is π/2.

The second aspect of the invention is further characterized in that a portion of the light beams downstream of the beam splitting and phase modulation is reflected and the light beam components are recombined and act, after passing through the polarizer, on the detector. The output of the detector is additionally demodulated by a second synchronous demodulator. Such second demodulator is driven by the product of two factors, the first being −1 when the first signal component is between 0 and π/2 or between π and 3π/2 and +1 when the first signal component is between π/2 and π or between 3π/2 and 2π. The signal demodulated by the second synchronous demodulator is provided for arithmetic compensation of the interferometer scale factor.

The preceding and other features and advantages of the invention will become further apparent from the detailed description that follows. Such written description is accompanied by a set of drawing figures. Numerals of the drawing figures, corresponding to those of the written description, point to the features of the invention. Like numerals refer to like features throughout both the written description and the drawing figures.

DETAILED DESCRIPTION OF THE PREFERRED EMBODIMENT

The fundamental functional principle of a measuring interferometer according to Michelson is described below. Reference is additionally made to U.S. Pat. No. 5,311,279, supra, for a detailed description, including mathematical interrelationships. As will be seen, such a Michelson interferometer is included in a known Sagnac interferometer for measuring rotation rate in accordance with the invention.

Figure 3:
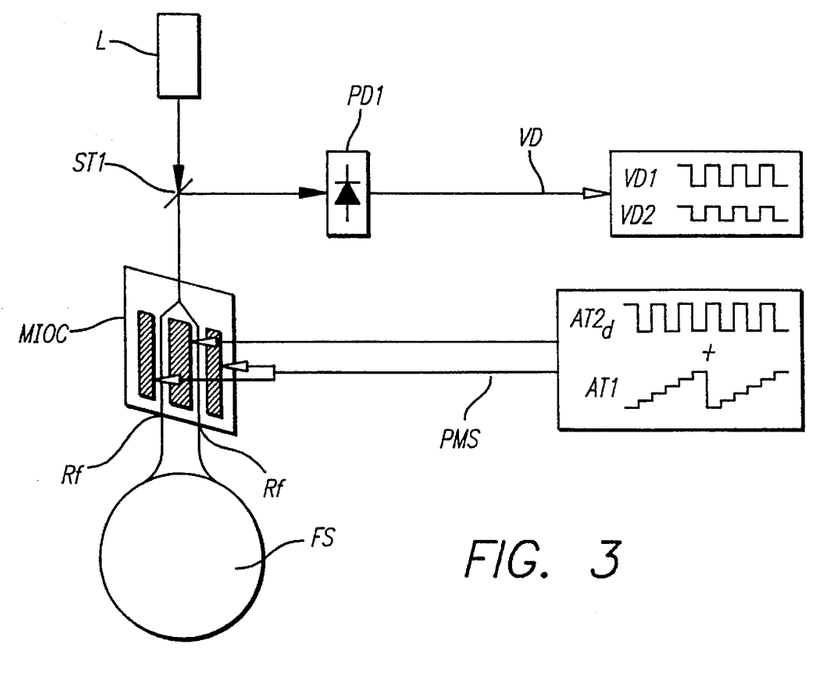
FIG. 3 is a schematic diagram of a basic fiber optic rotation rate sensor with multi-function integrated optics chip and deterministic modulation of the phase modulator integrated onto the chip.

In a Michelson interferometer, a pair of light beams originating from a light source are generated by beam splitting, phase shifted relative to one another and recombined. This creates an interference pattern that is received on a photodetector. Referring to FIG. 3, the detector signal VD2 corresponding to the light intensity of the interference pattern is proportional to the cosine of the phase shift θ (i.e. VD2~cos(θ)). The phase shift in the interferometer is $$\theta = 2 \cdot \pi \cdot n_1 \cdot l / \lambda$$

where $n_1$ is the refractive index of the light-conducting interferometer, l the geometric path difference of the two light beams obtained by beam splitting, and $\lambda$ the wavelength of the light.

As can be seen, for l>0, $\lambda$ is a function of wavelength; in such case, the absolute value of the phase shift change increases with l. Thus, the detector signal VD2 can in principle be employed to determine the wavelength of the light source L.

It is well known (cf. Lefèvre et al. in "Guided Optical Structure in Military Environment" (AGARD-CP-383) Istanbul, 23–27 Sep. 1985 p 9A/(1–13) that in measuring non-reciprocal phase shifts in a fiber optic Sagnac interferometer, the functions of the polarizer P (cf. FIG. 1) of the second beam splitter ST2 and the phase modulator PM can be combined on an integrated optics chip, based, for example, on lithium niobate. Such a multi-function integrated optics chip is designated hereinbelow "MIOC". When using deterministic modulation, $AT2_d$, of the phase modulator included within the MIOC, it is a stringent requirement that the reflections Rf at the transitions from the MIOC to the fiber coil FS not be reflected back into the waveguide. Otherwise a parasitic Michelson interferometer will build up in the MIOC whose signal VD2 could not be distinguished, at the photodetector PD1, from the actual measurement signal VD1 of the Sagnac interferometer. This situation is illustrated in the upper part of FIG. 3. The signal VD of the photodetector PD1 is composed of the two signal components VD1 and VD2; the two components cannot be separated from one another and therefore cannot be distinguished from one another.

Figure 4:
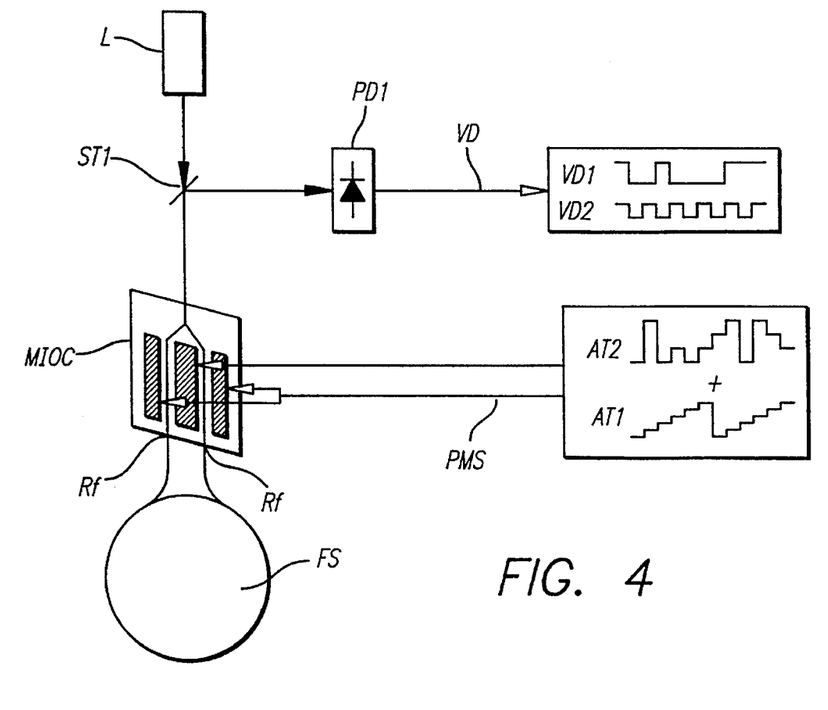
FIG. 4 is a schematic diagram corresponding to the representation of FIG. 3 for statistically variable modulation in which the multi-function integrated optics chip can be used with a Michelson interferometer to obtain a light wavelength-dependent signal.

It is known, as taught in U.S. Pat. No. 5,123,741 (cf. also basic presentation of the accompanying FIG. 4) that, as a result of statistical modulation AT2 of the phase modulator with a signal $m(n) = s(n) \cdot \pi/2 + r(n) \cdot \pi$, where, for example, s(n)=0 for n even, s(n)=1 for n odd and r(n) statistically alternates between 0 and 1, synchronous scatterings of the modulator signal PMS onto the detector PD1 are statistically independent of the useful signal VD1. The signal VD2 of the parasitic Michelson interferometer is also statistically independent, as shown below. The invention thus employs an originally undesired effect to obtain a measurement signal for stabilizing the wavelength of the light source L.

Since the two light beams reflected at the boundary surface between the MIOC and the fiber coil FS pass twice through the phase modulator PM (within the MIOC) in the same condition, they experience a phase shift which is twice as great as the two light beams coupled into the fiber coil FS experience. This gives the phase shift p(n) for n even as $p(n) = r(n) \cdot 2\pi$ and $p(n) = \pi + r(n) \cdot 2\pi$ for n odd.

Since the interference signal of the reflected light beams combined in the beam splitter ST2 (within the MIOC) is proportional to $\cos(p(n)+\theta)$, where $\theta$ is a modulation-independent phase shift in the Michelson interferometer, the modulation component $r(n) \cdot 2\pi$ is eliminated due to the $2\pi$ periodicity of the cosine, and the interference signal is proportional to $\cos(\theta)$ for n even and $\cos(p+\pi) = -\cos(\theta)$ for n odd. The interference signal is thus demodulable by s(n) and statistically independent of the Sagnac interferometer signal VD1 or S1 (cf. FIGS. 4 and 8). The signal S2 demodulated with s(n) or (2s(n)−1) yields a signal proportional to $\theta$ and, as described above, also proportional to the wavelength $\lambda$.

In addition to reflection at the transition from the MIOC to the fiber coil, reflection also takes place at the transition from the fiber coil to the MIOC. This reflection involves the light beams that have passed through the fiber coil FS. The reflected light beams pass once more through the fiber coil FS and, a time $2t_o$ after the first pass through the phase modulator, pass through the phase modulator again to generate an additional interferometer signal at the detector PD1. As a result of the double pass through the phase modulator, the phase shift p(n) of the light waves is equal to the sum of the phase shifts at times $n \cdot t_o$ and $(n-2) \cdot t_o$ and is obtained as follows: $p(n) = (r(n) + r(n-2)) \cdot \pi + (s(n) + s(n-2)) \cdot \pi/2$. Since $s(n) = s(n-2)$, the result for n even is $p(n) = (r(n) + r(n+2)) \cdot \pi$ and, for n odd, the result is $p(n) = (r(n) + r(n-2)) \cdot \pi + \pi$. The interferometer signal thus becomes $\cos((r(n) + r(n-2) + S(n)) \cdot \pi + \theta) = (2 \cdot r(n) - 1) \cdot (2 \cdot r(n-2) - 1) \cdot (2 \cdot s(n) - 1) \cdot \cos(\theta)$. This signal is again statistically independent of the Sagnac interferometer signal and the first Michelson interferometer signals.

Figure 5:
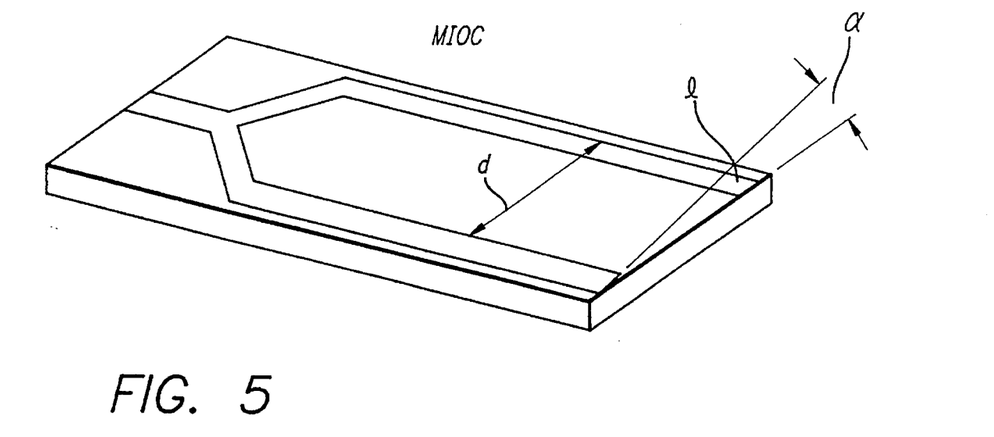
FIG. 5 is a perspective view of a multi-function integrated optics chip with slightly chamfered end surface at the exit side for obtaining an optical path difference between the two partial light beams.

To obtain a sufficiently large measurement signal, the path difference between the two reflected light waves must be as large as possible. It is advisable to select the path difference for a given wavelength so that $\theta = n \cdot \pi$. This way, the demodulated interferometer signal is zero and it is possible to determine a path length increase or decrease from the sign of the demodulated signal. As shown in FIG. 5, the path difference can be introduced, for example, by slight chamfering of the MIOC end surface on the side of the fiber coil FS at an angle $\alpha$; in this case, it has to be assured that sufficient intensity of the reflected light is still coupled in the waveguide and that the path difference is smaller than the coherence length of the light source. The following illustrative calculation illustrates a typical configuration (cf. FIG. 5):

$$l = 2 \cdot \sin(\alpha) \cdot d$$

where d is the spacing of the output arms of the beam splitter within the MIOC (approximately 300 μm) and $\alpha$ is the chamfer angle.

For $\alpha = 1°$, the result obtained is l = 2·sin(1°)·300 μm or 10.47 μm. The demodulated signal of the Michelson interferometer, for small deviations from the theoretical wavelength $\lambda_o$, assuming a refractive index for lithium niobate $n_{LiNbO_3}$ of 2.3, thus becomes: $S2 = (2.3 \cdot 10.47/\lambda_o) \cdot (1 - \lambda_o/\lambda) = 29 \cdot (1 - \lambda_o/\lambda)$, where $\lambda_o = 830$ nm is assumed.

The demodulated signal S2 is now, according to the invention, employed to stabilize the wavelength $\lambda$ of the light source L by temperature and/or injection current change or as a measure of the wavelength change in a superordinate computer system in the compensation of scale factor errors. The following must be recognized in regard to compensation of scale factor errors: As mentioned above, the scale factor of the rotation rate measurement signal is inversely proportional to the wavelength $\lambda$ of the light source. By measuring the wavelength change with the signal S2, scale factor changes may be compensated if the wavelength is not stabilized with S2. Such a process is particularly suitable for open loop scale factor stabilization. The functional blocks of FIG. 8 marked "temperature" and "injection current" could then be eliminated and a computation step $(k_1 \cdot S1) \cdot (1 - k_2 \cdot S2)$ carried out in the processor with regard to rotation rate. In such case $k_1$ would designate the scale factor at the theoretical wavelength while $k_2$ is a proportionality factor.

Figure 8:
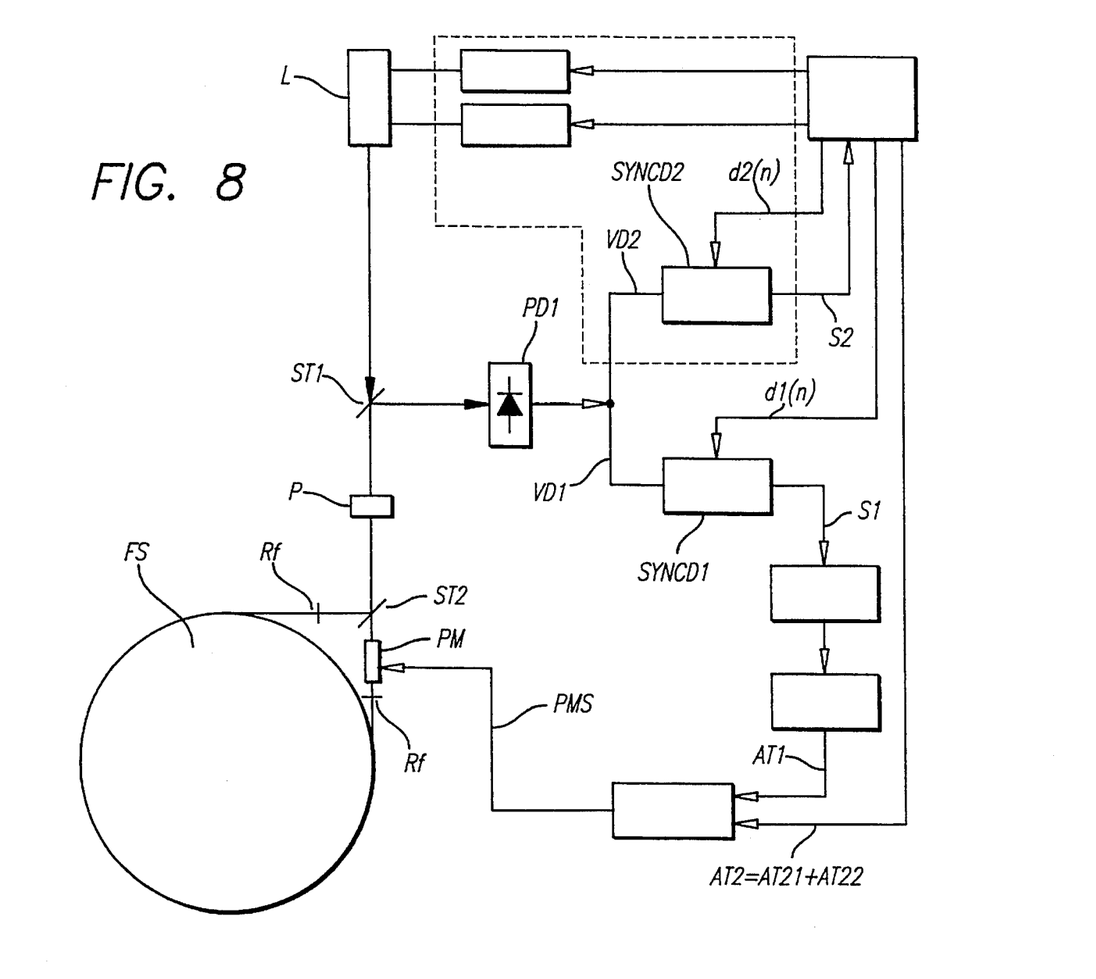
FIG. 8 is a functional block diagram of a fiber optic Sagnac interferometer in closed loop configuration with digital phase-ramp reset and statistically independent phase modulator drive signal generation with simultaneous utilization of the integrated optics chip as Michelson interferometer for obtaining a light wavelength-dependent signal for temperature and/or injection current regulation of the light source.

It must be recognized that, when the Sagnac interferometer is operated closed loop (e.g. as illustrated in FIG. 8), the reflected light beams are also phase-shifted by the ramp signal AT1 that compensates the non-reciprocal phase shift in the course of rotation. See FIGS. 9B and 9C. Since, as a result of the ramp, all phase shifts in the Michelson interferometer between 0 and $4\pi$ occur with uniform distribution, the signal S2, demodulated by s(n), is a periodic signal with constant amplitude whose phase relation P1 to the ramp signal is however linearly dependent upon the phase shift θ.

The phase relation P1 can be obtained, for example, by a further synchronous demodulator connected downstream of the second synchronous demodulator SYNCD2. The modulation sign of the demodulator alternates, for example, in each case at ramp value multiples of $\pi/2$. For circuits in which the ramp signal is digitally generated and the respective ramp value represented by a binary number, the demodulation sign can be obtained from the bit $b_{\pi/2}(n)$ which represents the ramp value $\pi/2$.

Figure 6:
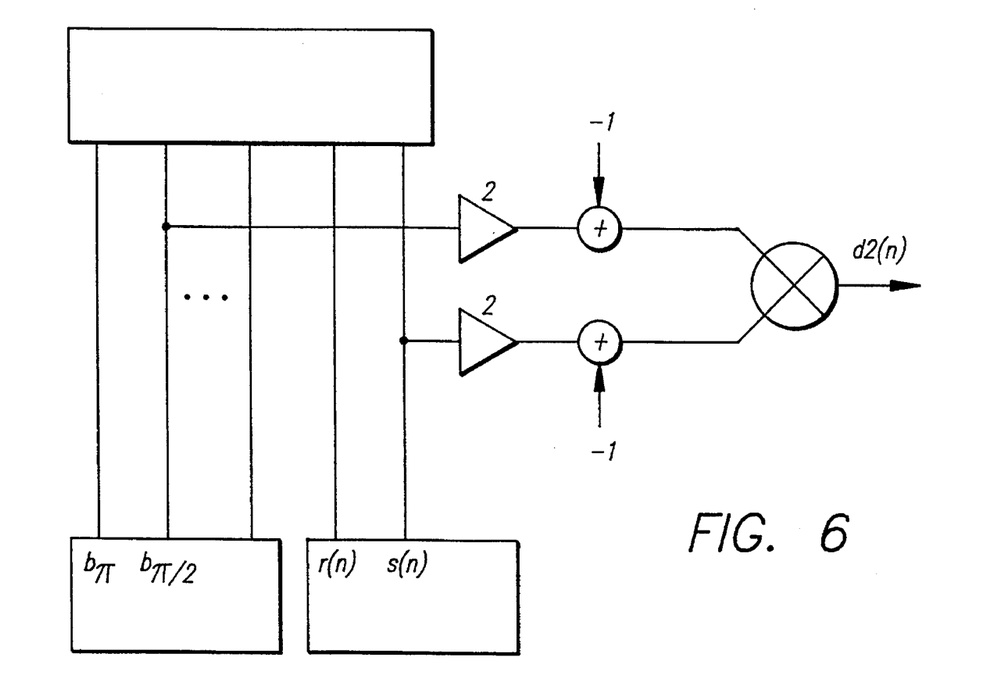
FIG. 6 is a functional block diagram of a (second) synchronous demodulator for generating the Michelson interferometer signal in accordance with the invention.

The two synchronous demodulators SYNCD1 and SYNCD2 that demodulate the Michelson interferometer signal can be combined into one synchronous demodulator that is driven by the product of the two above-described individual drive signals. Mathematically, this drive signal d2(n) may be expressed as follows (cf. FIG. 6):

$$d2(n)=(2 \cdot s(n)-1) \cdot (2 \cdot b_{\pi/2}(n)-1)$$

Figure 7:
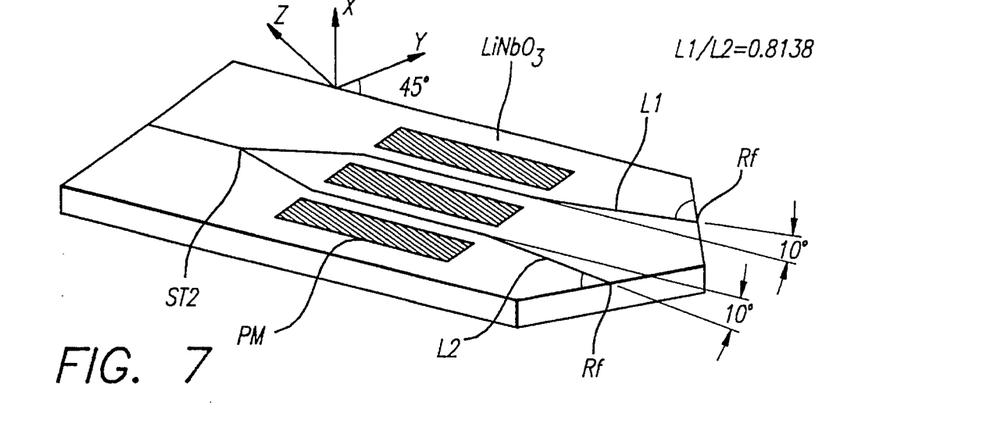
FIG. 7 is a perspective view of a multi-function integrated optics chip with temperature-stable Michelson interferometer in accordance with an alternative embodiment of the invention.

Furthermore, it must be taken into consideration that the phase θ to be measured is also dependent upon the refractive index n of the material of the MIOC and the geometric path difference l between the two reflected light beams and thus also upon their variation due to temperature influences. This difficulty can be circumvented by measurement of the temperature of the light path and corresponding correction of the measurement signal. In contrast to the light source L, however, ageing effects do not contribute. The temperature sensitivity may, according to another feature or embodiment of the invention, be overcome by selection of the material and the position of the waveguides within the MIOC so that the changes in refractive index and geometric path difference precisely cancel out. Such an arrangement is described in detail in U.S. Pat. No. 5,311,279, supra, and explained with reference to FIG. 7 below with regard to embodiment thereof adapted to the invention.

The changes in refractive index and in geometric path differences in the event of a temperature change can be avoided if waveguides are introduced with the phase modulator PM at 45° to the Y crystal axis and the two output arms L1, L2 of the Y branching ST2 following the phase modulator PM, deviating from 45° by +10° and −10° respectively and up to the coupling out pass through the different-length paths L1 and L2 on a substrate such as the X-section $LiNbO_3$ substrate customarily employed. In such case, for the path length differences in the selected example the following is applicable: L1/L2=0.8138. If, in regard to the path length differences, a maximum 10 μm delay is permitted, the lengths of the paths L1 and L2 are as follows L1=43.7 μm; L2=53.7 μm FIG. 8 is a simplified representation of an arrangement for measuring rotation rate that corresponds in principle to an interferometer in accordance with FIG. 7 of U.S. Pat. No. 5,123,741, supra. Such arrangement includes no scale factor regulation. Rather it is supplemented by a Michelson interferometer arrangement in accordance with the invention that includes a synchronous demodulator to stabilize the wavelength of the light source L by regulation of temperature or injection current change. The left-hand portion of the fiber optic interferometer of FIG. 8 has been disclosed with reference to FIGS. 1 and 2. The output of the photodetector PD1 contains the two signal components, already explained with reference to FIGS. 3 and 4, VD1 (signal dependent upon a rotation rate) and VD2 (Michelson interferometer measurement signal). Such signals act jointly on the input side upon two synchronous demodulators SYNCD1 and SYNCD2. Reference is made to the detailed representation in U.S. Pat. No. 5,123,741 in regard to the demodulation signal d1(n) for the first synchronous demodulator SYNCD1 allocated to the demodulation of the signal VD1. The signal d1(n) is, in the linear sensor, statistically independent of all signals occurring in the modulation process, especially disturbing signals, as well as the reset signal PMS for the phase modulator PM. The signal S1, which is demodulated by the first synchronous demodulator SYNCD1 and dependent upon rotation rate, passes (in a manner similar to that illustrated in FIG. 7 of U.S. Pat. No. 5,123,741) to an integrator and a ramp generator, and then acts, in the form of a ramp signal AT1 dependent upon rotation rate (cf. FIGS. 9A to 9C), on an adder with modulo formation. The adder is acted upon, on the input side, by a second signal component $AT_2$ composed of the sum of two components. The first component AT21 is formed from alternately successive values 0 and $\pi/2$, and the second component AT22 of θ and $\pi$ which are successive substantially without correlation.

The second signal component VD2, formed from the Michelson interferometer within the MIOC of the photodetector PD1, is demodulated by the second synchronous demodulator SYNCD2 with the aid of the demodulation signal d2(n) (explained supra with reference to FIG. 6) and thus provides correction signal S2 to the superordinate microprocessor for altering the temperature or injection current for the light source L. The portion of FIG. 8 that is essential to the invention is indicated by dotted outline. As can be seen, the second amplified signal component VD2 output from the photodetector PD1 thus acts on the second synchronous demodulator SYNCD2 (which is clocked with the frequency $F_o$). The demodulation signal of such signal component, which is dependent upon the ramp value, changes with the deterministic phase modulation value s(n) and the (averaged) output signal S2 that corresponds to the incremental wavelength-dependent phase shift of the two reflected light beams.

Figure 9A:
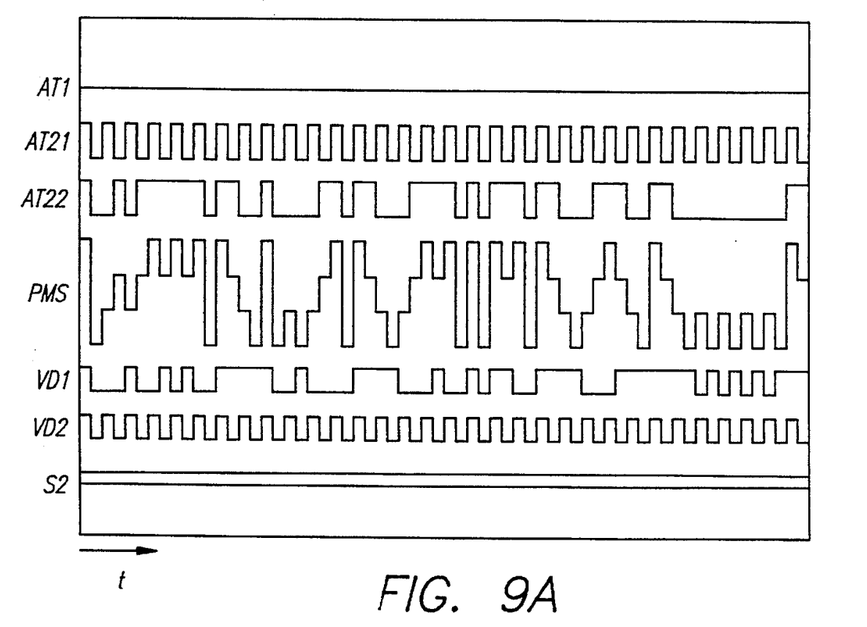
FIGS. 9A to 9C are a series of sets of waveforms that illustrate typical signal progressions at identified points of the circuit configuration of FIG. 8 for various sensor operational conditions, the waveforms of FIG. 9A illustrating signal progressions in the neutral position of the rotation rate sensor (i.e. without ramp signal, but with interferometer deviation), FIG. 9B illustrating the corresponding signal progressions with a rotation rate present, (i.e. with ramp signal) with a stable light wavelength and without deviation of the Michelson interferometer, and FIG. 9C illustrating the corresponding signal progressions with a rotation rate present (i.e. with ramp signal) and with a light-source wavelength to be readjusted (i.e. with deviation of the Michelson interferometer).
Figure 9B:
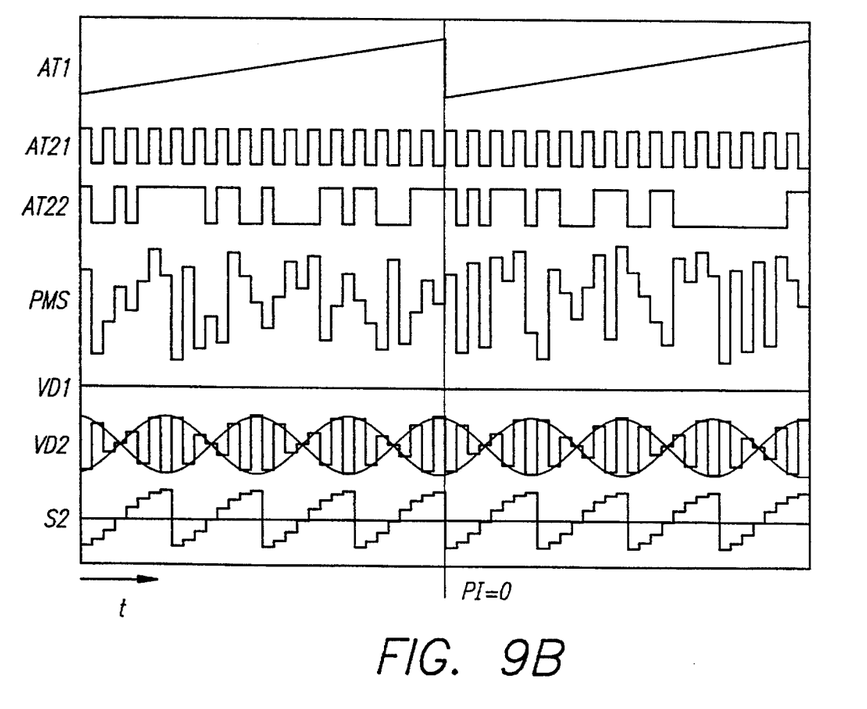
Figure 9C:
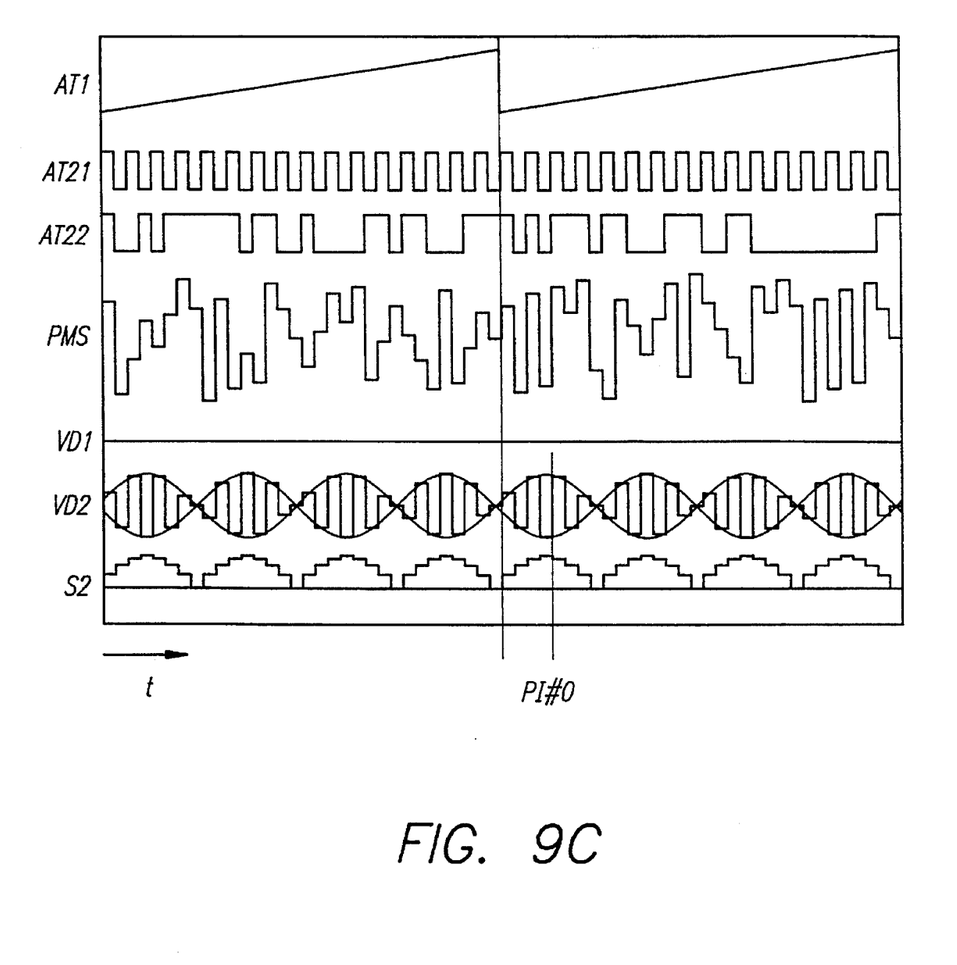

FIGS. 9A to 9C show typical signal progressions for differing, above-indicated operational conditions of the fiber optic Sagnac interferometer: The ramp signal AT1, whose gradient corresponds to the rotation rate; the deterministic above-identified modulation signal component AT21; the statistical, above-identified modulator signal PMS; the Sagnac interferometer signal VD1 and the Michelson interferometer signal VD2; and the actuating or regulating signal S2, obtained by demodulation with the signal d2(n), for stabilization of the wavelength of the (semi-conductor) light source L.

The solid line in FIGS. 9A to 9C, which corresponds to the signal S2, indicates zero. It is evident from this that the averaged signal S2 in FIG. 9C is positive, while in FIG. 9B almost 0 emerges as mean value, due to the phase relation P1.

To obtain a compact construction employing integrated optics as much as possible, it is useful to combine the beam splitting and modulation on an integrated optics chip that serves at the same time as an additional measuring interferometer whose two output are each connected to an end of the fiber coil. Reflection then takes place at the end transitions from the integrated optics chip to the fiber coil.

A signal demodulated by the second synchronous demodulator serves, in an embodiment, as the control signal for a compensation computation in a superordinate computer system to determine the temperature and/or compensation current change for the light source.

When using an integrated optics chip to form the measuring interferometer, a small path difference of the two light beams generated by the beam splitting is introduced by chamfering the transition location from the integrated optics chip to the fiber coil. If the temperature of the measuring interferometer is measured (i.e. that of the integrated optics chip), then the measured temperature value can be used to correct the measurement signal obtained by the second synchronous demodulator in the superordinate computer system.

Thus it is seen that the present invention provides the advantages of the direct measurement of light source wavelength in a fiber optic Sagnac interferometer without significant additional hardware expenditure.

While this invention has been described with reference to its presently preferred embodiment, it is not limited thereto. Rather, this invention is limited only insofar it is defined by the following set of patent claims and includes within its scope all equivalents thereof.

What is claimed is:

1. In a fiber optic Sagnac interferometer for measuring rotation rate of the type in which a pair of light beams that originate from a light source, are polarized and generated by beam splitting, injected in opposite directions into a fiber coil and subsequently recombined, wherein the created interference pattern acts, after passing through the polarizer, on a detector whose output corresponds to the light intensity of the interference pattern and in which the light beams are modulated by means of a phase modulator located downstream of the beam splitting and ahead of the fiber coil by a signal composed of a plurality of variable components and limited by a modulo operation to $2\pi$, and in which a first signal component is a ramp generated by means of an integration process that compensates non-reciprocal incremental phase shifts of the two light beams and a second signal component has a positive integral value of $\pi/2$ in each instance for a time $t_o$, the transit time of each light beam through the fiber coil in the neutral condition, and in which the second signal component is composed of the sum of two components, of which the first component is formed from alternately successive values 0 and $\pi/2$ and the second component is formed from values 0 and $\pi$ which are successive to a large extent without correlation, and in which the output of the detector is demodulated by a first synchronous demodulator driven by the product of four factors, of which the first factor is $-1$, the second factor is $-1$ when said second component is 0, and is $+1$ when said second component is $\pi$, the third factor is $-1$ when said second component derived from the last preceding modulation cycle is 0, and is $+1$ when said second component derived from the preceding modulation cycle is $\pi$, and the fourth factor is $-1$ when said first component is 0, and is $+1$ when said first component is $\pi/2$, the improvement comprising, in combination:

a) a portion of the light beams downstream of the beam splitting and the phase modulation being reflected and said reflected light beam components being recombined and directed, after passing through said polarizer onto said detector;

b) said output of said detector being demodulated by a second synchronous demodulator driven by the product of two factors, of which (i) said first factor is $-1$ when said first component is 0, and $+1$ when said first component is $\pi/2$, (ii) said second factor is $-1$ when said ramp is between 0 and $\pi/2$ or between $\pi$ and $3\pi/2$ and, $+1$ when said ramp is between $\pi/2$ and $\pi$ or between $3\pi/2$ and $2\pi$; and c) said signal demodulated by said second synchronous demodulator varies the wavelength of said light source by selectively varying at least one of two factors, the temperature and the source injection current of said light source.

2. An interferometer as defined in claim 1 wherein said signal demodulated by said second synchronous demodulator comprises a control signal for computation of light source compensation by a superordinate computer.

3. An interferometer as defined in claim 2 wherein:

a) said beam splitting and phase modulation are combined on an integrated optics chip that constitutes an additional measuring interferometer;

b) one end of the fiber coil is connected to each output of said integrated optics chip; and c) the light beam components are reflected at the end-face transition locations from the integrated optics chip to the fiber coil.

4. An interferometer as defined in claim 3 further characterized in that a small path difference is introduced in said integrated optics chip by chamfering the transition location from said integrated optics chip to said fiber coil.

5. An interferometer as defined in claim 4 further characterized in that said chamfer angle $\alpha$ and said integrated optics chip are selected to be within the range of 0.5° to 2° to the direction of propagation of the light beams in said integrated optics chip.

6. An interferometer as defined in claim 5 wherein said chamfer angle $\alpha$ and said integrated optics chip are selected to be preferably at approximately 1° to the direction of propagation of the light beams in said integrated optics chip.

7. An interferometer as defined in claim 3 further characterized in that the temperature of the measuring interferometer is measured and said measured temperature employed to correct said measurement signal obtained by means of said second synchronous demodulator in the superordinate computer.

8. An interferometer as defined in claim 4 further characterized in that the direction of the light paths within said integrated optics chip is selected with respect to the crystal axes of said chip substrate and path lengths with regard to the polarization direction so that the optical path length difference remains unchanged in the event of changes in chip temperature.

9. A fiber optic Sagnac interferometer for measuring rotation rate of the type in which, (i) light beams that originate from a light source and are polarized by a polarizer and generated by beam splitting, are injected in opposite directions into a fiber coil and subsequently recombined, (ii) the resulting interference pattern acts, after passing through the polarizer, on a detector whose output corresponds to the intensity of the interference pattern, (iii) the two light beams are modulated by a phase modulator located downstream of the beam splitting and before the fiber coil, (iv) the amplified photodetector output being fed to a first synchronous demodulator, (v) the modulation signal acting on the phase modulator being formed of the sum of two components, the first component being alternately successive values 0 and $\pi/2$ and the second component being 0 and $\pi$ which are successive to a large extent without correlation, (vi) said first synchronous demodulator being driven by the product of four factors, the first factor being $-1$, the second factor being $-1$ when said second component is 0, and $+1$ when said second component is $\pi$, the third factor being $-1$ when said second component derived from the last preceding modulation cycle is 0 and $+1$ when said second component derived from the preceding modulation cycle is $\pi$ and the fourth factor is $-1$ when said first component is 0, and is $+1$ when said first component is $\pi/2$, further characterized in that:

a) a portion of the light beams downstream of said beam splitting and said phase modulation is reflected and said light beam components are recombined and act, after passing through said polarizer, on said detector;

b) the output of said detector is additionally demodulated by a second synchronous demodulator, said second demodulator being driven by the product of two factors, of which (i) said first factor is −1 when said first component is 0, and +1 when said first component is $\pi/2$, (ii) said second factor is − 1 when said ramp is between 0 and $\pi/2$ or between $\pi$ and $3\pi/2$ and, +1 when said ramp is between $\pi/2$ and $\pi$ or between $3\pi/2$ and $2\pi$: and c) the signal demodulated by said second synchronous demodulator is provided for arithmetic compensation of said interferometer scale factor.

* * * * *